United States Patent
Srinivasan et al.

(10) Patent No.: US 9,258,254 B2
(45) Date of Patent: Feb. 9, 2016

(54) VIRTUAL ROUTER AND SWITCH

(71) Applicant: Oracle International Corporation, Redwood City, CA (US)

(72) Inventors: Arvind Srinivasan, San Jose, CA (US); Shimon Muller, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 188 days.

(21) Appl. No.: 13/909,460

(22) Filed: Jun. 4, 2013

(65) Prior Publication Data

US 2014/0269686 A1 Sep. 18, 2014

Related U.S. Application Data

(60) Provisional application No. 61/799,455, filed on Mar. 15, 2013.

(51) Int. Cl.
*H04L 12/935* (2013.01)
*H04L 12/931* (2013.01)
*H04L 12/775* (2013.01)

(52) U.S. Cl.
CPC ............ *H04L 49/3009* (2013.01); *H04L 45/58* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 7,289,456 | B2 * | 10/2007 | Gupta et al. | 370/254 |
| 2005/0276263 | A1 * | 12/2005 | Suetsugu et al. | 370/389 |
| 2008/0112403 | A1 * | 5/2008 | Larsen et al. | 370/389 |
| 2009/0225759 | A1 * | 9/2009 | Hussain et al. | 370/395.1 |
| 2013/0071116 | A1 * | 3/2013 | Ong | 398/45 |
| 2013/0132532 | A1 * | 5/2013 | Zhang et al. | 709/220 |

* cited by examiner

*Primary Examiner* — Benjamin H Elliott, IV
(74) *Attorney, Agent, or Firm* — Park, Vaughan, Fleming & Dowler LLP; Steven E. Stupp

(57) ABSTRACT

An input/output (I/O) switch fabric includes input physical ports that convey packets associated with at least a first network flow. Moreover, virtual routers in the I/O switch fabric, which have associated routing tables, provide types of service and/or routes for different source-destination pairs based on link-layer information and network-layer information in the packets. Note that different virtual routers can provide different types of service and/or different routes. For example, a type of service associated with a first virtual router may include changing packet headers when crossing service domains in a global network, and a type of service associated with a second virtual router may avoid changing packet headers when providing connectivity in the network. Furthermore, the I/O switch fabric includes output physical ports that convey packets associated with at least a second network flow. The virtual routers may facilitate InfiniBand inter-subnet crossing.

18 Claims, 6 Drawing Sheets

VIRTUAL ROUTER AND SWITCH

CROSS REFERENCE TO RELATED APPLICATION

This application claims priority under 35 U.S.C. §119(e) to U.S. Provisional Application Ser. No. 61/799,455, entitled "Virtual Router and Switch," by Arvind Srinivasan and Shimon Muller, filed on Mar. 15, 2013, the contents of which is herein incorporated by reference.

BACKGROUND

1. Field

The disclosed embodiments generally relate to a packet-processing technique for communications networks. More specifically, the disclosed embodiments relate to the design of a packet-processing network which is based on a network switch fabric with virtual routers.

2. Related Art

In high-performance systems, a network or input/output (I/O) switch fabric typically plays an important role in traffic movement between servers. For example, with servers running multiple virtual machines (VMs) and many virtualized applications, network-packet streams coming out of a server often include an aggregation of different services that are needed by each of the VMs and their applications. Moreover, when there are a large numbers of servers and VMs in an InfiniBand network fabric, the servers are typically split into multiple subnet domains. In order to communicate between subnets, InfiniBand subnet routing is typically used.

Within this aggregated network pipe, individual network-packet streams (representing different source-destination pairs) tend to have different requirements. Moreover, at times these requirements may be in conflict with each other. For example, one network-packet stream may be associated with communication between two VMs on the same subnet, and another network-packet stream may be associated with communication among different subnets (thereby implying subnet routing). In a typical system, a physical port tends to provide only one type of service, as either a switch or a router. Multiple levels of service usually do not simultaneously exist with granular control of the service level (such as fine-grain routing with higher throughput and lower latency switching and management). Consequently, it can be difficult to maintain the quality of service at the application level throughout the network switch fabric when multiple applications communicate across servers using existing network switch fabrics.

Hence, what is needed is a network switch fabric that facilitates communication of network-packet streams without the problems described above.

SUMMARY

One embodiment of the present disclosure provides an input/output (I/O) switch fabric that includes input physical ports, where a given input physical port conveys packets associated with at least a first network flow. Moreover, virtual routers in the I/O switch fabric, which are coupled to the input physical ports, have associated routing tables. A virtual router may represent a resource that can be enabled on any given physical port that facilitates multiple routing services. Note that a given virtual router provides a type of service for a given source-destination pair based on network-layer information in the packets, and different virtual routers can provide different types of service. Furthermore, the I/O switch fabric includes output physical ports, where a given output physical port conveys packets associated with at least a second network flow.

In some embodiments, the I/O switch fabric includes: classifiers, coupled to the input physical ports, which separate packets for network flows associated with different types of service and/or different routes, and which convey the packets to the virtual routers.

Moreover, the virtual routers may facilitate different paths, including paths from different output physical ports to a common destination. For example, the paths may be specified deterministically in the routing tables based on predefined output physical ports. Alternatively or additionally, the paths may be specified in the routing tables using a hashing technique to determine particular output physical ports.

Note that the different paths may be selected based on: source information; destination information, a load-balancing parameter, a redundancy parameter, and a hop-count policy.

Furthermore, a type of service associated with a first virtual router may include changing packet headers when crossing service domains in a global network, and a type of service associated with a second virtual router may avoid changing packet headers when providing connectivity in the network.

The virtual routers may facilitate InfiniBand inter-subnet crossing (which is sometimes referred to as 'subnet crossing' or 'subnet-domain crossing').

Another embodiment provides a system that includes the I/O switch fabric.

Another embodiment provides a method for routing and switching packets. During the method, the I/O switch fabric receives the packets on physical input ports, where a given physical input port conveys packets associated with at least the first network flow. Then, the method separates the packets associated with the routing from the packets associated with the switching. Moreover, the method processes the packets associated with the switching. Next, for the packets associated with the routing, the method selects paths for the packets using virtual routers having associated routing tables. Note that a given virtual router is a resource that can be enabled on any given physical port, the given virtual router provides a type of service for a given source-destination pair based on network-layer information included in the packets, and different virtual routers can provide different types of service and/or different routes. Furthermore, the method provides the packets associated with the switching and the routing on physical output ports, where a given physical output provides packets associated with at least a second network flow.

In some embodiments, the method further includes modifying headers of the packets associated with the routing.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an input/output (I/O) switch fabric, a system that includes the I/O switch fabric, and a method for routing and switching packets are described. This I/O switch fabric includes input physical ports that convey packets associated with at least a first network flow. Moreover, virtual routers in the I/O switch fabric, which have associated routing tables, provide types of service and/or routes for different source-destination pairs based on network-layer information in the packets. Note that different virtual routers can provide different types of service and/or different routes. For example, a type of service associated with a first virtual router may include changing packet headers when crossing service domains in a global network, and a type of service associated with a second virtual router may avoid changing packet headers when providing connectivity in the network. Furthermore, the I/O switch fabric includes output physical ports that convey packets associated with at least a second network flow.

The virtual routers may facilitate different paths, including paths from different output physical ports to a common destination. These different paths may be selected based on: source information; destination information, a load-balancing parameter, a redundancy parameter, and a hop-count policy. In addition, the virtual routers may facilitate Infini-Band inter-subnet crossing.

By facilitating the use of different paths in a network, the communication technique allows the requirements associated with different network flows to be met without conflicts. Therefore, the communication technique may help: scaling of bandwidth, fabric size (such as a number of connected nodes), redundancy and administration scope.

Figure 1:
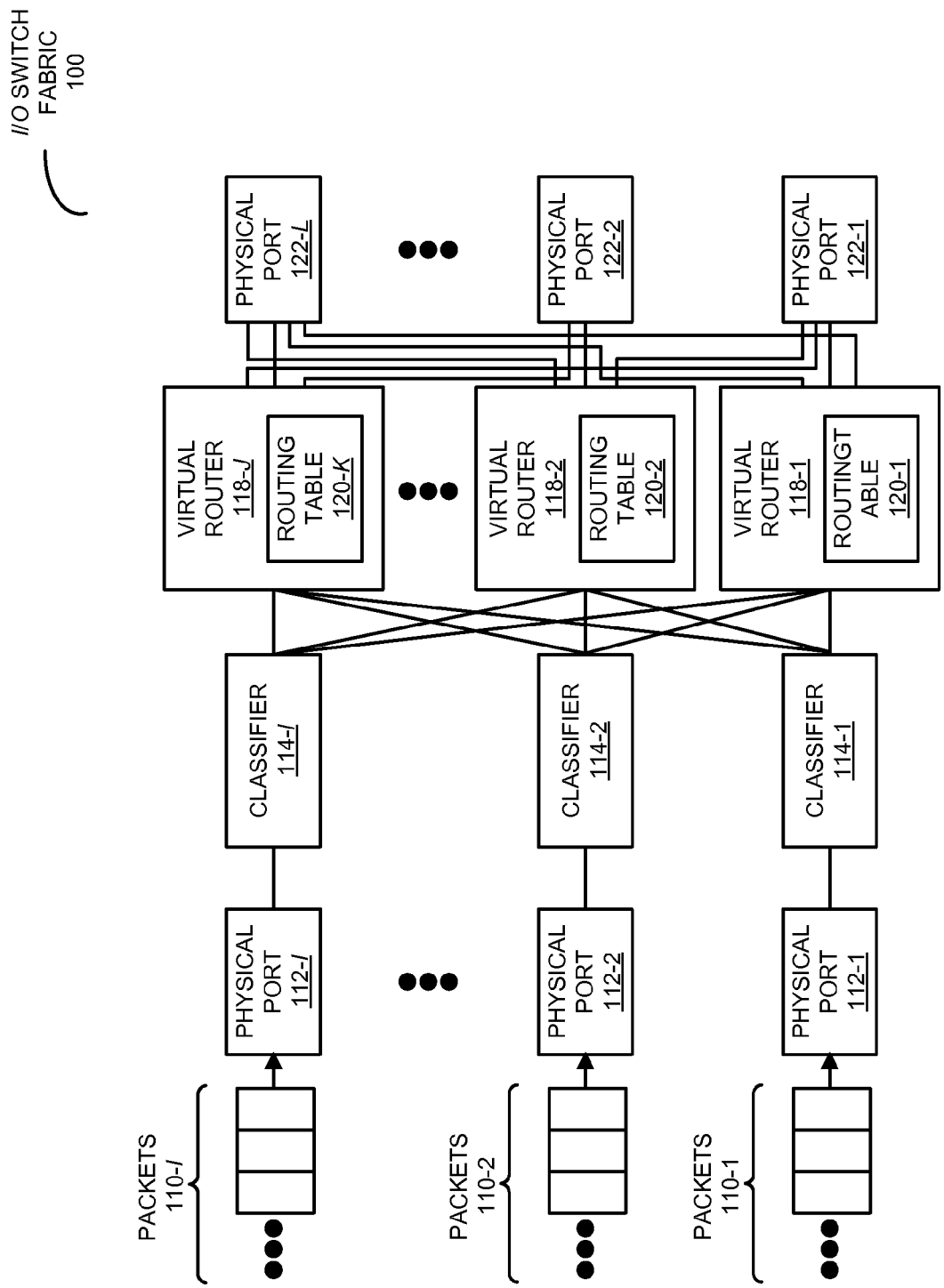
FIG. 1 is a block diagram illustrating an input/output (I/O) switch fabric in accordance with an embodiment of the present disclosure.

We now describe embodiments of the I/O switch fabric and the system. FIG. 1 presents a block diagram illustrating I/O switch fabric 100. This I/O switch fabric includes physical ports 112, where a given one of physical ports 112 (such as physical port 112-1) conveys packets (such as some of packets 110) associated with at least a first network flow.

Moreover, virtual routers 118 in I/O switch fabric 100, which are coupled to physical ports 112, have associated routing tables 120. A virtual router may represent a resource that can be enabled on any given physical port that facilitates multiple routing services. Note that a given virtual router (such as virtual router 118-1) provides a type of service or a class of traffic for a given source-destination pair based on network-layer information (in an Open Systems Interconnection or OSI model), which is included in packets 110 (such as in headers), and different virtual routers can provide different types of service and/or different routes. Furthermore, I/O switch fabric 100 includes physical ports 122, where a given physical port (such as physical port 122-1) conveys packets (such as some of packets 110) associated with at least a second network flow.

In some embodiments, I/O switch fabric 100 includes classifiers 114, which are coupled to physical ports 112, and which separate packets 110 for network flows associated with different types of service and/or different routes. Note that classifiers 114 may be implemented using one or more integrated circuits. Furthermore, I/O switch fabric 100 may convey packets 110 to virtual routers 118.

As described further below with reference to FIG. 3, virtual routers 118 may facilitate different paths in a network, including paths from different physical ports 122 to a common destination. For example, the paths may be specified deterministically in routing tables 120 based on predefined physical ports 122. Alternatively or additionally, the paths may be specified in routing tables 120 using a hashing technique to determine particular physical ports 122. Note that the different paths may be selected based on: source information; destination information, a load-balancing parameter, a redundancy parameter, and a hop-count policy.

Furthermore, a type of service associated with one of virtual routers 118 may include changing packet headers when crossing service domains in a global network, and a type of service associated with another of virtual routers 118 may avoid changing packet headers when providing connectivity in the network.

As described further below with reference to FIG. 3, virtual routers 118 may facilitate InfiniBand inter-subnet crossing.

Figure 2:
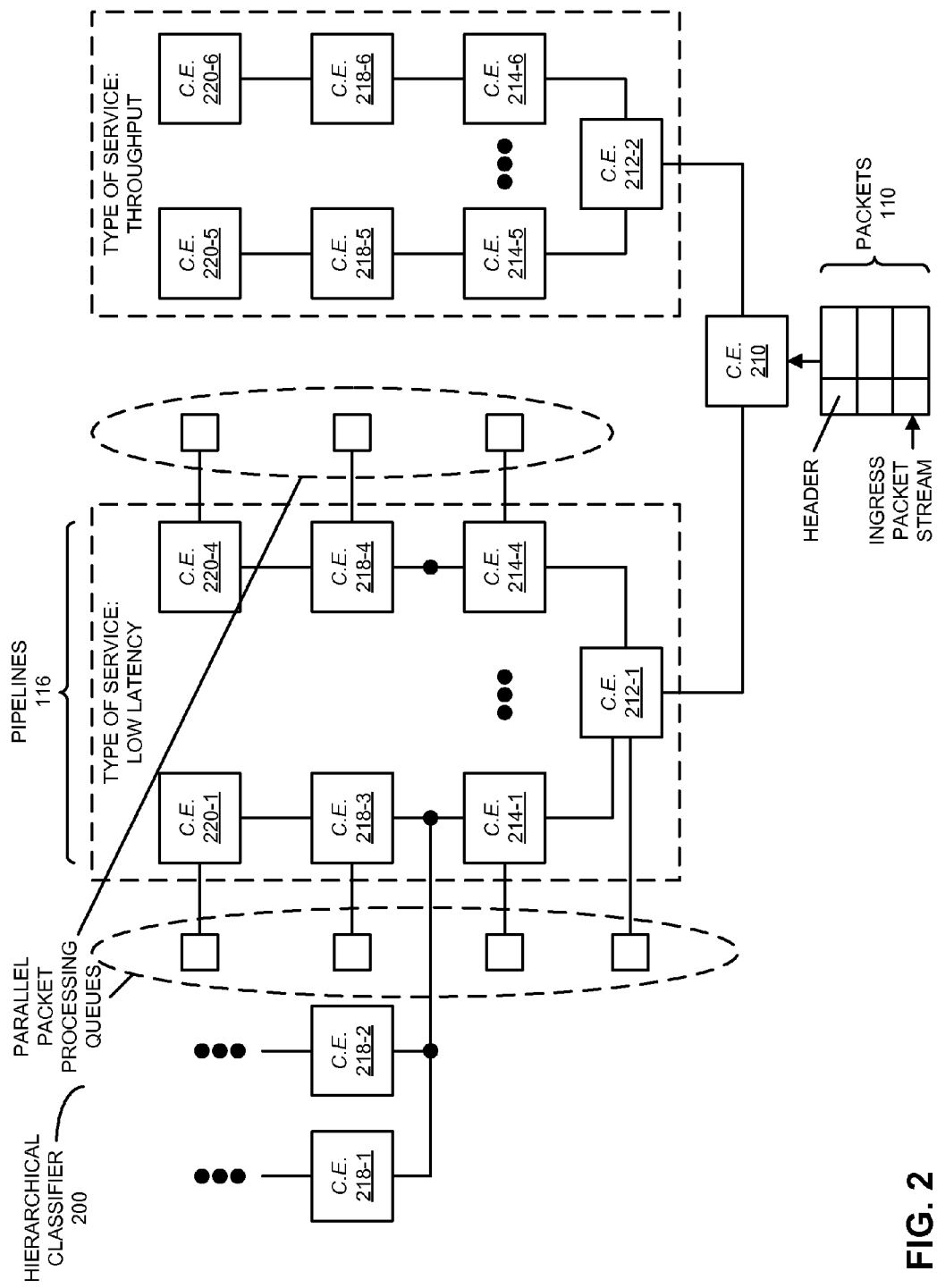
FIG. 2 is a block diagram illustrating a hierarchical classifier in the I/O switch fabric of FIG. 1 in accordance with an embodiment of the present disclosure.

We now further discuss the classifiers. While a wide variety of classifiers may be used, in an exemplary embodiment hierarchical classifiers are used. This is shown in FIG. 2, which presents a block diagram of hierarchical classifier 200. This hierarchical classifier includes a classification engine (C.E.) 210 that separates packets 110 based on at least one of physical-layer information and link-layer information in the OSI model, which are included in packets 110 (such as in headers). For example, the physical-layer information may include the port of arrival, and the link-layer information may include the Media Access Control address and the Virtual LAN tag. Note that packets 110 may be associated with one or more: network flows, policies (e.g., for a switch) and/or services. In the present discussion, network flows are used as an illustrative example.

Moreover, hierarchical classifier 200 includes subsequent classification engines 214, coupled to classification engine 210, which further separate packets 110 into multiple parallel pipelines 216 (which are coupled to virtual routers 118 in FIG. 1) based on layer information in the OSI model, which is included in packets 110, and which is other than the physical-layer information and the link-layer information. Note that classification engine 210 and classification engines 214 may maintain a relative ordering of packets 110 in network sub-flows while allowing changes in the relative ordering among different network flows.

For example, second classification engines 214 may further separate packets 110 based on network-layer information in the OSI model, which is included in the packets. In particular, the network-layer information may include packet forwarding protocols and techniques, such as switching or routing.

In some embodiments, the hierarchy includes one or more additional stages. In particular, hierarchical classifier 200 may include classification engines 218, coupled to at least one of classification engines 214 and at least some of parallel pipelines 216, which further separate packets 110 based on transport-layer information in the OSI model, which is included in packets 110. For example, the transport-layer information may include end-to-end communication services for applications in a layered architecture of network components and protocols, such as: connection-oriented data stream support (such as the transmission control protocol), reliability, flow control, and multiplexing. As shown in FIG. 2, hierarchical classifier 200 may include multiple recursive classification stages, such as classification engines 218-1 and 218-2, which branch off after classification engine 214-1. Additionally, hierarchical classifier 200 may include classification engines 220, coupled to at least one of classification engines 218 and at least some of parallel pipelines 216, which further separate packets 110 based on application-layer information in the OSI model, which is included in packets 110. For example, the application-layer information may include communication protocols and process-to-process communications across an Internet Protocol. Thus, the application-layer information may include applications or services associated with packets 110.

Classification engines 212, 214, 218 and 220 in hierarchical classifier 200 may each optionally output packets 110 to one or more piplelines to processing queues or nodes. (For clarity in FIG. 2, the processing queues are only shown for the classification engines in the low-latency type of service. While these processing queues are not shown in the throughput type of service, they are also included.)

By implementing classification of packets 110 in a cascaded or hierarchical manner, in which the depth of the classification is, in general, increased in subsequent stages, the classification can be implemented in an efficient manner that readily scales at higher data rates. Moreover, the number of classification engines in hierarchical classifier 200 may increase as packets 110 progress through the hierarchy. However, while the classification technique is illustrated in FIG. 2 with a tree-like structure having branches, note that a given classification engine in a particular stage (such as classification engine 214-1) may separate a given packet in: a shorter time than classification engine 210; the same amount of time as classification engine 210; or a longer time than classification engine 210. More generally, hierarchical classifier 200 may maintain an order of different classes of service so that the different classes of service avoid impacting each other during recursive classification. Furthermore, packets 110 may have different sizes for different classes of service and/or the network sub-flows may belong to the same class of service. The different classes of service may be indicated by one or more packet headers in the operating-system stack. The multiple recursive classification engines in the branches of hierarchical classifier 200 may allow these different classes of service to be processed using different pipelines.

In an exemplary embodiment, classification engine 210 is a shallow classification stage that is a precursor to the main classification stage in classification engines 212. For example, based on the type of service needed (e.g., low latency) for a given packet, classification engine 210 may choose or select the appropriate next classification engine (such as one of classification engines 214), and then may provide the given packet to the selected classification engine. This classification technique parallelizes the classification stages, with each subsequent stage capable of further fine-grained or deeper parallel processing.

We now describe exemplary embodiments of the I/O switch fabric. As noted previously, when there are a large number of servers and virtual machines (VMs) in an InfiniBand network fabric, the servers are typically split into multiple subnet domains. Moreover, in order to communicate among subnets, InfiniBand subnet routing is typically used because, if there are more than approximately 48,000 addressable nodes, different subnets are needed to address more nodes and to limit the administration (or the scope of a subnet domain).

Furthermore, because of different requirements associated with different network-packet streams or flows, and because an existing physical port tends to provide only one type of service as either a switch or a router, multiple levels of service in InfiniBand usually do not simultaneously exist with granular control of the service level.

The communication technique described above solves the traffic/application requirement problem by providing a virtualized routing service at the level of a physical port of a network switch (i.e., in the I/O switch fabric). This may be facilitated by using a smart classification engine (e.g., in the hierarchical classifier) that divides the traffic or network flows into different virtual ports. Using routing tables in the virtual routers, different service resources and levels may be associated with various virtual-port numbers. Note that by configuring the I/O switch fabric, traffic flows corresponding to different service levels can bypass one another. Moreover, once it is determined that packets require routing (such as to a different subnet domain in InfiniBand), differentiated service levels can be applied between various routing techniques.

Furthermore, the communication technique provides a framework to have multiple routing services by using a virtual router. As noted previously, a virtual router may represent a resource that can be enabled on any given physical port. This virtual router can be addressed using one or more InfiniBand local identifiers (LIDs). Note that the resource in a given virtual router may represent a collection of routing tables and a programmable set of routing techniques. In turn, the routing techniques may represent a collection of header fields that may be used for route lookup and a set of actions or operations that result based on the lookup.

Examples of the actions or operations that may result from these route lookups may include: header replacement policies, determining an egress port number and service level, dropping a packet, and/or initiating a learning process (for example, the packet may be sent to a centralized management agent to learn routes). In the header replacement policies, some link-layer headers in the packets may be replaced, all network-layer headers in the packets may be replaced, etc. The optional replacement of the headers with a private set of headers may only be understood by the hierarchy of a similar virtual router.

In addition, examples of routing techniques in the virtual routers may include: choosing different fields from the packet headers to be matched during route lookup; and choosing among multiple available paths to reach a given destination (for example, a path may be selected by performing a hashing operation on source fields, by performing a hashing operation on network flows, etc.).

By providing multiple virtual router resources, multiple differentiated services can be provided for the same source-destination node pair based on link-layer and network-layer information in the OSI model. This is illustrated in FIG. 3, which presents a block diagram of a system 300 that includes I/O switch fabric 310 (which is an embodiment of I/O switch fabric 100 in FIG. 1). In this system, network flows may be specified using a destination local identifier (DLID) in the link-layer information and/or a destination global identifier (DGID) in the network-layer information. Note that the dashed line and the dotted line in FIG. 3 represent across or inter-subnet routing, while the dashed and dotted line represents same subnet switching.

Figure 3:
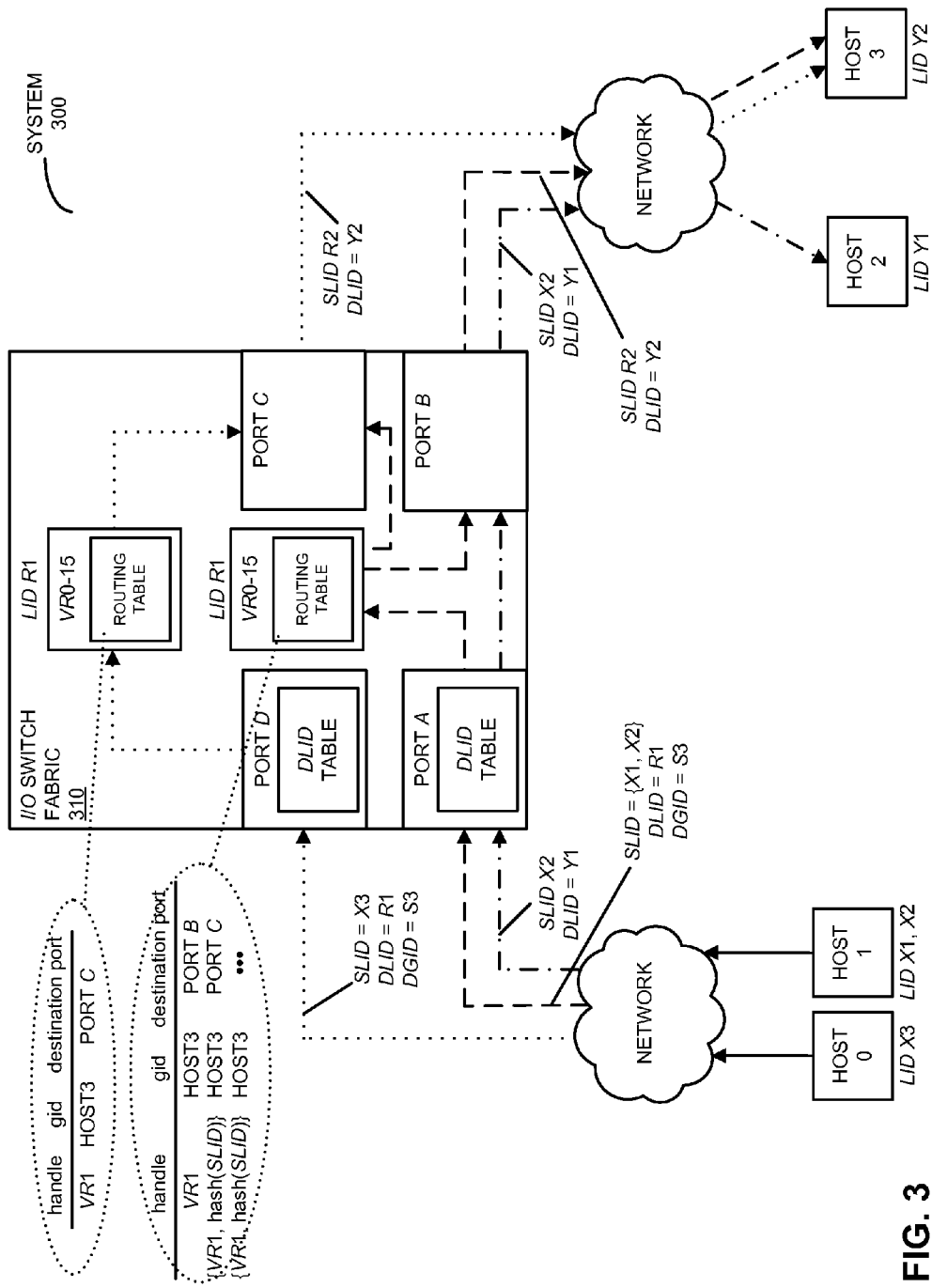
FIG. 3 is a block diagram illustrating a system that includes an I/O switch fabric in accordance with an embodiment of the present disclosure.

Furthermore, as illustrated in FIG. 3, the policies of each of the virtual routers (VR) may be deterministic or based on a hashing technique. This may allow each of the virtual routers to provide a different service to address or provide: load balancing, redundancy, and/or a hop-count policy. In FIG. 3, when a virtual router conveys a packet across a subnet domain, the packet header may be changed.

As noted previously, the classifiers in I/O switch fabric 310 may be used to segregate packets for network-packet streams or network flows with different types of service and/or different routes, and parallel pipelines are used to convey the segregated packets to different virtual routers so different types of service and/or different routes can be provided.

By using virtual routers, multi-pathing may be implemented in system 300, so that there are different ways or paths (with different physical ports) for packets to reach a given destination from the same source. For example, by choosing different virtual routers on the same physical port A, multi-pathing is possible between host 1 and host 3. The routing tables may be defined so that the path selection can be either deterministic (with a one-to-one match) or based on a simple hashing. As illustrated in FIG. 3, if the VMs in these hosts are in the same subnet domain, they can continue to perform packet switching.

Figure 4:
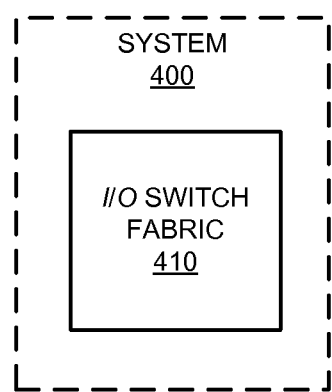
FIG. 4 is a block diagram illustrating a system that includes the I/O switch fabric of FIG. 1 or 3 in accordance with an embodiment of the present disclosure.

I/O switch fabric 100 (FIG. 1) and/or hierarchical classifier 200 (FIGS. 1 and 2) may be included in a variety of systems, such as system 300 and, more generally, system 400 shown in FIG. 4 (which includes I/O switch fabric 410). In general, functions of the I/O switch fabric, the hierarchical classifier and the system may be implemented in hardware and/or in software. Thus, the I/O switch fabric and/or the system may include one or more program modules or sets of instructions stored in an optional memory subsystem (such as DRAM or another type of volatile or non-volatile computer-readable memory), which may be executed by an optional processing subsystem. Note that the one or more computer programs may constitute a computer-program mechanism. Furthermore, instructions in the various modules in the optional memory subsystem may be implemented in: a high-level procedural language, an object-oriented programming language, and/or in an assembly or machine language. The programming language may be compiled or interpreted, e.g., configurable or configured, to be executed by the processing subsystem.

Components in the I/O switch fabric and/or the system may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, the system may be at one location or may be distributed over multiple, geographically dispersed locations.

In the communication technique, packets may be received via a network, such as: the Internet, World Wide Web (WWW), an intranet, a cellular-telephone network, LAN, WAN, MAN, Ethernet, InfiniBand, or a combination of networks, or other technology enabling communication between computing systems.

Note that the system may include: a VLSI circuit, a switch, a hub, a bridge, a router, a communication system (such as a WDM communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Moreover, a given computer system may be at one location or may be distributed over multiple, geographically dispersed locations.

Furthermore, the embodiments of the I/O switch fabric, the hierarchical classifier and/or the system may include fewer components or additional components. For example, there may be fewer or more classification engines and/or classification stages in classifiers 114 (FIG. 1) and hierarchical classifier 200 (FIG. 2). Although these embodiments are illustrated as having a number of discrete items, the I/O switch fabric, the hierarchical classifier and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the I/O switch fabric, the hierarchical classifier and/or the system may be implemented more in hardware and less in software, or less in hardware and more in software, as is known in the art.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Figure 5:
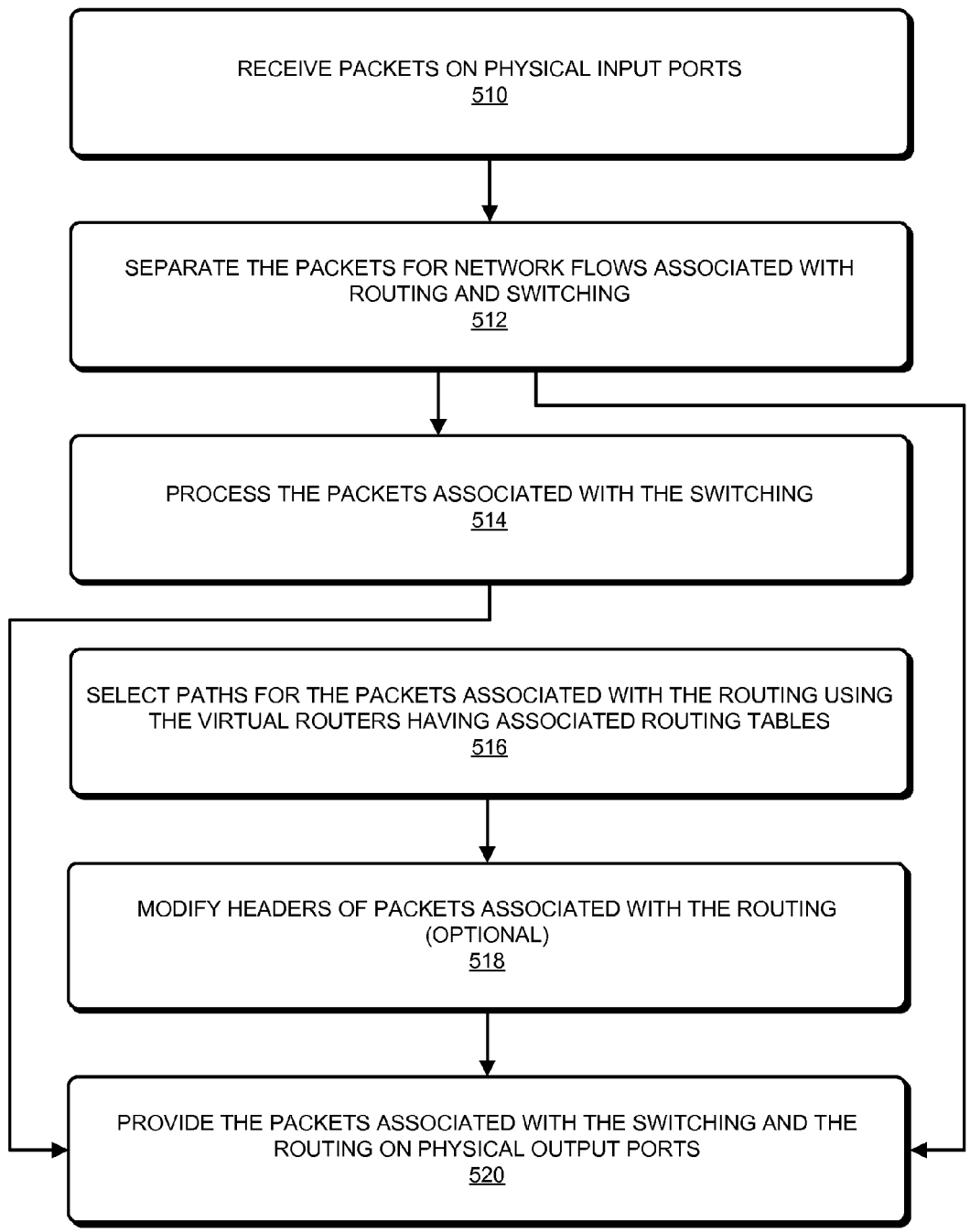
FIG. 5 is a flow chart illustrating a method for routing and switching packets in accordance with an embodiment of the present disclosure.

We now describe the method. FIG. 5 presents a flow chart illustrating a method 500 for routing and switching packets, which may be performed by an I/O switch fabric (such as I/O switch fabric 100 in FIG. 1). During this method, the I/O switch fabric receives the packets on physical input ports (operation 510), where a given physical input port conveys packets associated with at least a first network flow. Then, the packets associated with the routing are separated from the packets associated with the switching (operation 512). For the packets associated with the switching, the packets are processed (operation 514). Alternatively or additionally (i.e., in parallel with operation 514), for the packets associated with the routing, paths are selected for the packets using virtual routers having associated routing tables (operation 516). Note that a given virtual router is a resource that can be enabled on any given physical port, the given virtual router provides a type of service for a given source-destination pair based on network-layer information included in the packets, and different virtual routers can provide different types of service and/or different routes. Furthermore, the packets associated with the switching and the routing are provided on physical output ports (operation 520), where a given physical output provides packets associated with at least a second network flow.

In some embodiments, headers of the packets associated with the routing are optionally modified (operation 518).

Figure 6:
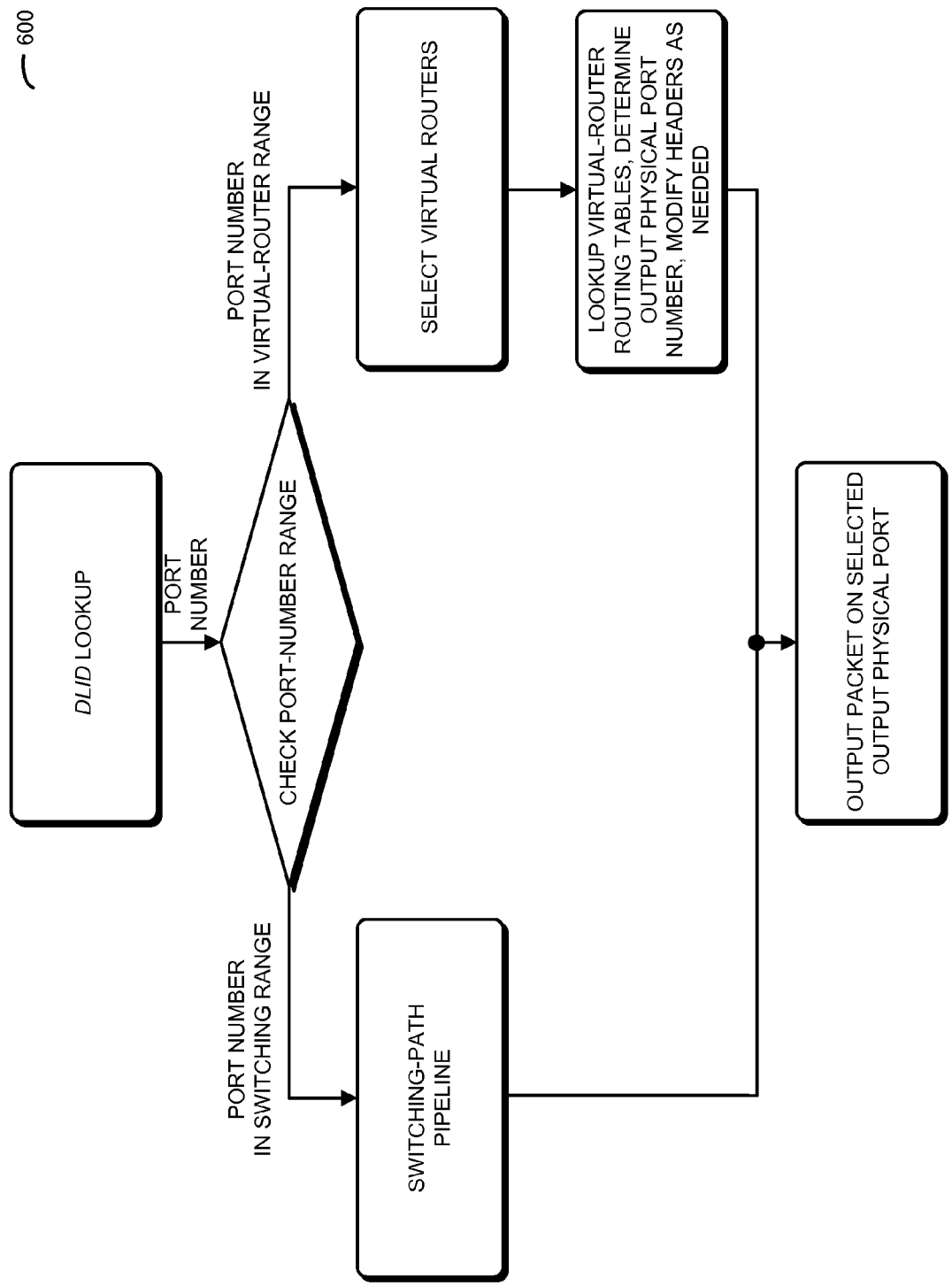
FIG. 6 is a flow chart illustrating a method for routing and switching packets in accordance with an embodiment of the present disclosure.

FIG. 6 presents a flow chart illustrating an exemplary embodiment of a method for routing and switching packets. In this method, as packets are received on a given physical input port, a DLID lookup is performed to determine a corresponding virtual port number. This DLID lookup is equivalent to a first level of classification in a hierarchical classifier. The virtual port numbers have multiple ranges that represent the switching path and the routing path and can be encoded.

If the virtual port number is within the switching range, the packets are sent towards the switching-path pipelines and the packet is sent out on the chosen output physical port. This output physical port can be derived from the virtual port number (for example, the derivation can be a simple one-to-one mapping or can be more complicated). In this switching path, the packet headers can be transformed if required. Note that the switching path is low latency.

Alternatively, if the virtual port number is within the routing range, then the packets are sent towards the routing-path pipeline. In the routing-path pipeline, a virtual router is selected that is used for the routing. Note that there can be multiple virtual routers per input port providing different types of services.

Once a virtual routher is selected, the routing tables corresponding to the virtual router are looked up. These routing tables specify the output physical port number and if any headers require modification. Based on these operations, the packet is forwarded to the chosen output physical port (after header transformation, if required). Note that the routing-path pipeline can be of any latency Furthermore, the output physical port chosen by the switching-path pipleline(s) and/or the routing-path pipelines can be same or different.

In some embodiments of methods 500 (FIG. 5) and 600, there are additional or fewer operations. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An input/output (I/O) switch fabric, comprising:
input physical ports, wherein a given input physical port is configured to convey packets associated with at least a first network flow;
virtual routers, coupled to the input physical ports, having associated routing tables, wherein a given virtual router is a resource that can be enabled on any given physical port, wherein the given virtual router provides a type of service for a given source-destination pair based on network-layer information in the packets, wherein different virtual routers can provide one of: different types of service and different routes, wherein a type of service associated with a first virtual router includes changing packet headers when crossing service domains in a global network, and wherein a type of service associated with a second virtual router avoids changing packet headers when providing connectivity in the network; and
output physical ports, wherein a given output physical port is configured to convey packets associated with at least a second network flow.

2. The I/O switch fabric of claim 1, wherein the I/O switch fabric further comprises classifiers, coupled to the input physical ports, configured to separate packets for network flows associated with one of: the different types of service and the different routes and to convey the packets to the virtual routers.

3. The I/O switch fabric of claim 1, wherein the virtual routers facilitate different paths, including paths from different output physical ports to a common destination.

4. The I/O switch fabric of claim 3, wherein the paths are specified deterministically in the routing tables based on predefined output physical ports.

5. The I/O switch fabric of claim 3, wherein the paths are specified in the routing tables using a hashing technique to determine particular output physical ports.

6. The I/O switch fabric of claim 3, wherein the different paths are selected based on one or more of: source information; destination information, a load-balancing parameter, a redundancy parameter, and a hop-count policy.

7. The I/O switch fabric of claim 1, wherein the virtual routers facilitate InfiniBand inter-subnet crossing.

8. A system, comprising an input/output (I/O) switch fabric, wherein the I/O switch fabric includes:
input physical ports, wherein a given input physical port is configured to convey packets associated with at least a first network flow;
virtual routers, coupled to the input physical ports, having associated routing tables, wherein a given virtual router is a resource that can be enabled on any given physical port, wherein the given virtual router provides a type of service for a given source-destination pair based on network-layer information in the packets, wherein different virtual routers can provide one of: different types of service and different routes, wherein a type of service associated with a first virtual router includes changing packet headers when crossing service domains in a global network, and wherein a type of service associated with a second virtual router avoids changing packet headers when providing connectivity in the network; and output physical ports, wherein a given output physical port is configured to convey packets associated with at least a second network flow.

9. The system of claim 8, wherein the I/O switch fabric further comprises classifiers, coupled to the input physical ports, configured to separate packets for network flows associated with one of: the different types of service and the different routes and to convey the packets to the virtual routers.

10. The system of claim 8, wherein the virtual routers facilitate different paths, including paths from different output physical ports to a common destination.

11. The system of claim 10, wherein the paths are specified deterministically in the routing tables based on predefined output physical ports.

12. The system of claim 10, wherein the paths are specified in the routing tables using a hashing technique to determine particular output physical ports.

13. The system of claim 10, wherein the different paths are selected based on one or more of: source information; destination information, a load-balancing parameter, a redundancy parameter, and a hop-count policy.

14. The system of claim 8, wherein the virtual routers facilitate InfiniBand inter-subnet crossing.

15. A method for routing and switching packets, wherein the method comprises:

using an input/output (I/O) switch fabric, receiving the packets on physical input ports, wherein a given physical input port conveys packets associated with at least a first network flow;

separating the packets associated with the routing from the packets associated with the switching;

processing the packets associated with the switching;

for the packets associated with the routing, selecting paths for the packets using virtual routers having associated routing tables, wherein a given virtual router is a resource that can be enabled on any given physical port, wherein the given virtual router provides a type of service for a given source-destination pair based on network-layer information included in the packets, wherein different virtual routers can provide one of: different types of service and different routes, wherein a type of service associated with a first virtual router includes changing packet headers when crossing service domains in a global network, and wherein a type of service associated with a second virtual router avoids changing packet headers when providing connectivity in the network; and providing the packets associated with the switching and the routing on physical output ports, wherein a given physical output provides packets associated with at least a second network flow.

16. The method of claim 15, wherein the method further comprises modifying headers of the packets associated with the routing.

17. The method of claim 15, wherein the virtual routers facilitate different paths including different output physical ports to a common destination.

18. The method of claim 15, wherein the virtual routers facilitate InfiniBand inter-subnet crossing.

* * * * *